United States Patent [19]
Marvel et al.

[11] Patent Number: 6,161,429
[45] Date of Patent: Dec. 19, 2000

[54] DUAL PATH PROFILOGRAPH

[75] Inventors: Frederick J. Marvel, Wheat Ridge, Colo.; Colin T. Fleming; Zbigniew Rybak, both of Bulimba, Australia

[73] Assignee: Paveset America, LLC, Denver, Colo.

[21] Appl. No.: 09/170,186

[22] Filed: Oct. 13, 1998

[51] Int. Cl.[7] .................................................. G01B 5/28
[52] U.S. Cl. .................................. 73/146; 73/8; 73/105; 33/521
[58] Field of Search ................................ 73/8, 105, 146; 33/521

[56] References Cited

U.S. PATENT DOCUMENTS

| | | |
|---|---|---|
| 2,784,496 | 3/1957 | Rousse . |
| 3,222,787 | 12/1965 | Young . |
| 4,158,258 | 6/1979 | McKechnie . |
| 4,741,207 | 5/1988 | Spangler . |
| 4,771,549 | 9/1988 | Shelangoskie et al. . |
| 4,922,752 | 5/1990 | Kitazume et al. . |
| 5,065,618 | 11/1991 | Hodges, Sr. et al. . |
| 5,107,598 | 4/1992 | Woznow et al. . |
| 5,255,561 | 10/1993 | Fleming et al. . |
| 5,280,719 | 1/1994 | Noss . |
| 5,301,548 | 4/1994 | Theurer . |
| 5,440,923 | 8/1995 | Arnberg et al. . |
| 5,614,670 | 3/1997 | Nazarian et al. . |
| 5,774,374 | 6/1998 | Scott et al. ................................ 73/146 |

FOREIGN PATENT DOCUMENTS 1230236  12/1966  Germany .

OTHER PUBLICATIONS

Straightedge for Highways, Product Engineering, Nov. 10, 1958, p. 83.

*Primary Examiner*—Eric S. McCall
*Attorney, Agent, or Firm*—Ancel W. Lewis, Jr.

[57] ABSTRACT

Apparatus for measuring two parallel spaced surface profiles is disclosed. The apparatus disclosed has dual laterally spaced beams linked to a transport device shown as a trailer that is towable by a motor vehicle. Each beam has a profiling wheel that measures road surface deviations and transmits the resulting measurements to a recording device. The beams are foldable and stowable on the trailer for transport of the apparatus between measuring sites.

14 Claims, 5 Drawing Sheets

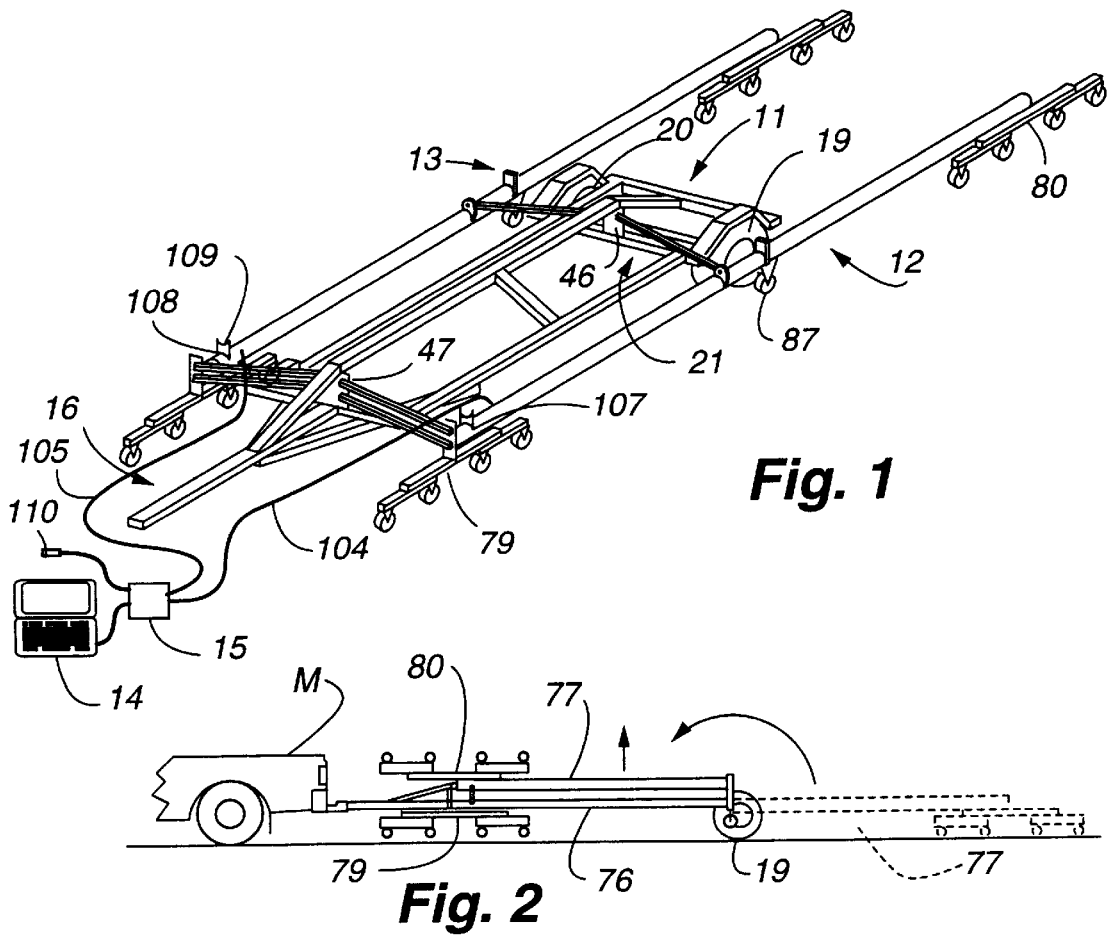
Fig. 1
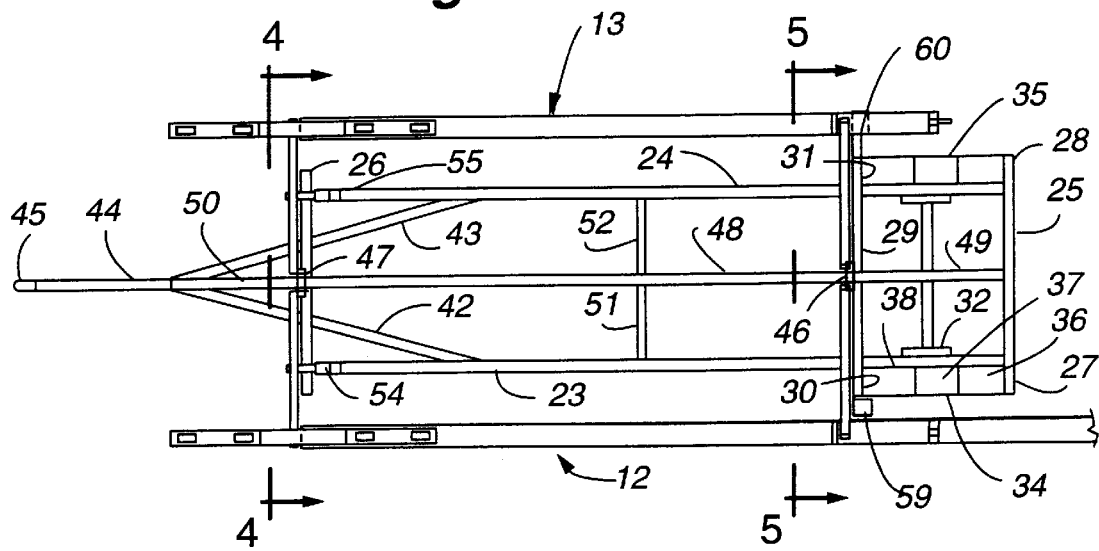
Fig. 2
Fig. 3

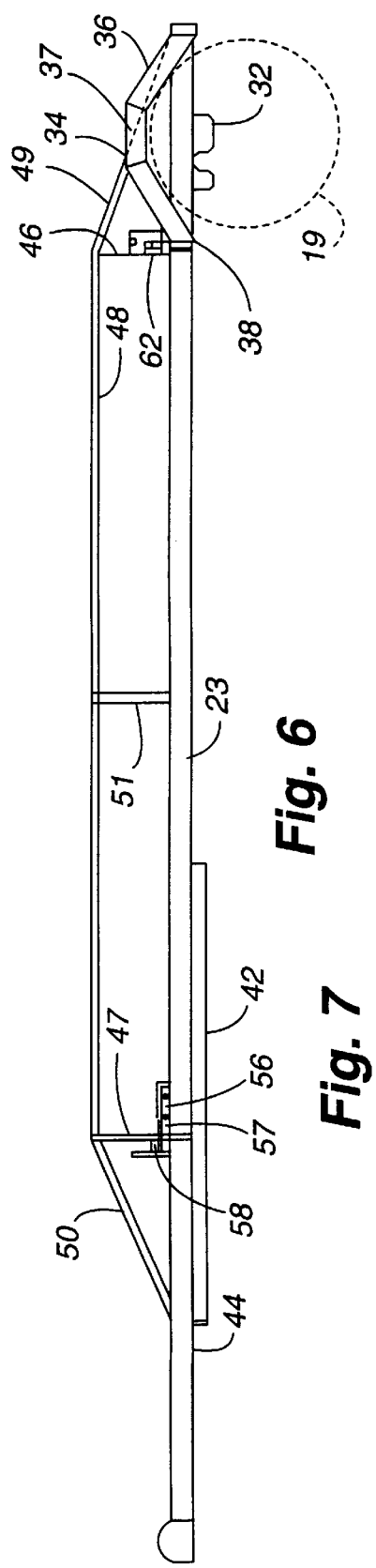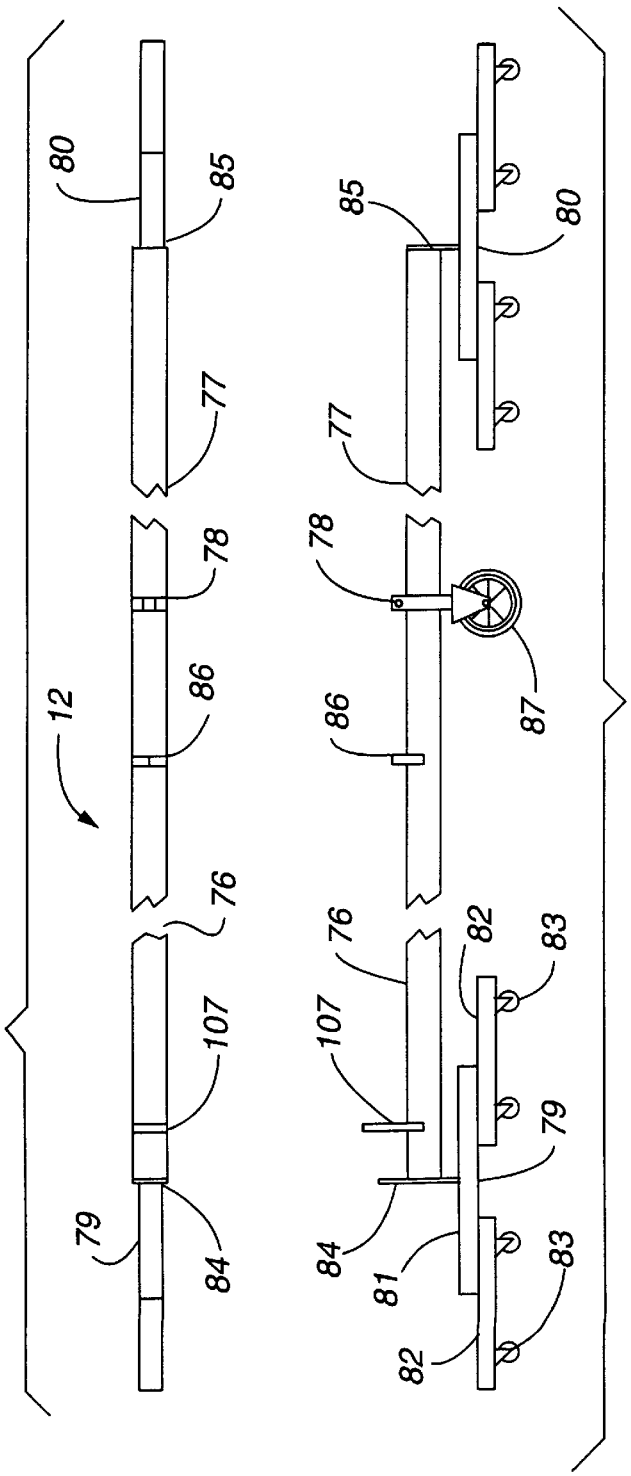

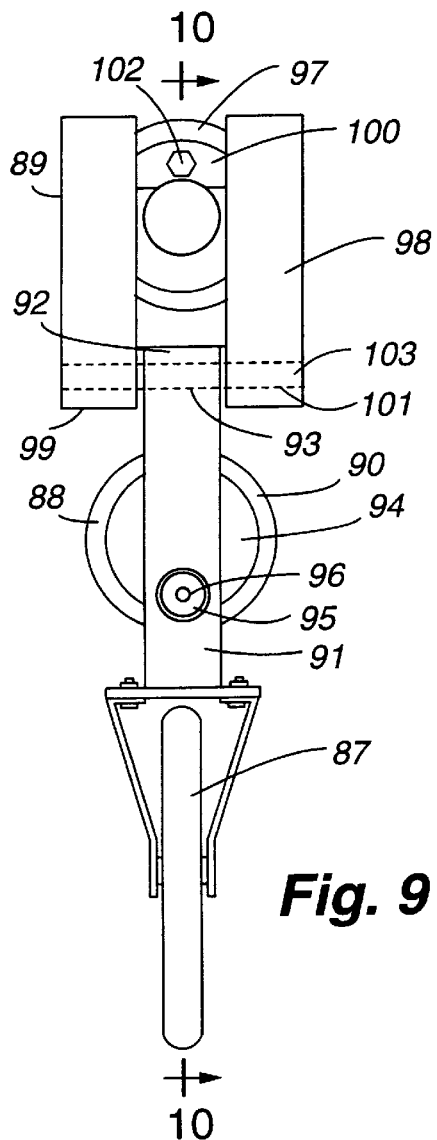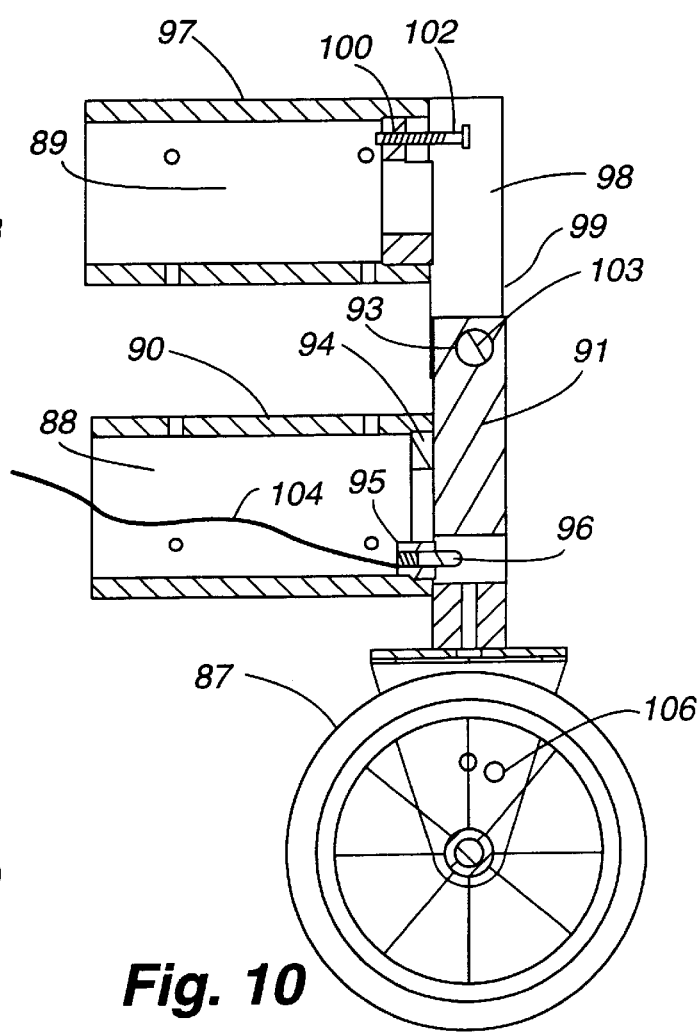
Fig. 9
Fig. 10

DUAL PATH PROFILOGRAPH

TECHNICAL FIELD

The present invention relates to apparatus for measuring the smoothness of a surface and more particularly to a towable profilograph for measuring and recording dual parallel profiles of a surface.

BACKGROUND ART

State and federal agencies set smoothness or road profile requirements for roads such as highways and airport runways. Roads must be measured after construction to verify that the requirements have been met. Paved roads are also measured prior to being overlaid to determine the fill depth of new pavement at each point.

A road profile can be measured with traditional surveying equipment. This method is entirely manual and extremely slow.

Apparatus and methods have been devised that use accelerometers or inclinometers to measure the profile of a road. In each of these apparatus and methods surface deviations are measured as acceleration normal to the road surface. The measurements are dependent on the speed and acceleration of the apparatus and the slope of the road. The methods associated with these apparatus involve complex calculations and filtering to convert the measured acceleration into a surface profile. The apparatus must be maintained at a constant speed during measuring so the road portions covered during acceleration and deceleration are not measured.

Prior known devices for measuring the profile of a road include single beam profilographs. These devices have an elongated beam supported at each end by a wheeled truck or bogie. A center profiling wheel directly measures deviations in the road providing higher accuracy and less complexity than the profiling devices with accelerometers. These devices are manually pushed or pulled along a road. Measurements for surface deviation and distance are manually read and recorded. Although faster than surveying, these devices are slow.

Prior known beam profilographs have a fixed rear bogie and a castered front bogie. On curving roads the path traveled by the profiling wheel is neither the path of the front bogie nor the path of the rear bogie. A single path is measured at a time. Synchronization of the profiles for both sides of a lane for a paving machine is difficult. Since these devices are manually pushed or pulled the operator may be exposed to traffic.

DISCLOSURE OF THE INVENTION

A profilograph having two parallel measuring beams connected to a trailer that is towed by a motor vehicle is disclosed. The measuring beams are foldable and are stowed on the trailer without disconnection from the trailer for transport between measurement sites. The measuring beams are linked to the trailer with pivotal links that keep the beams independent from one another while keeping the beams parallel to the direction of travel of the trailer. The two measuring beams simultaneously measure corresponding surface profiles on opposite sides of a road lane so that the profiles are synchronized. Dual path profiles and distance preferably are recorded by a laptop computer in the interior of the towing vehicle.

BRIEF DESCRIPTION OF THE DRAWINGS

Details of this invention are described in connection with the accompanying drawings that bear similar reference numerals in which:

FIG. 1 is a perspective view of a profilograph embodying features of the present invention in a measuring configuration.

FIG. 2 is a side elevational view of the profilograph of FIG. 1 in a traveling configuration with the measuring configuration in dashed lines.

FIG. 3 is a top plan view showing the profilograph of FIG. 1 with the left or first beam in the measuring configuration and the right or second beam in the traveling configuration.

FIG. 6 is a side elevational view showing the trailer of FIG. 1.

FIG. 7 is a top elevational view showing one beam of FIG. 1.

FIG. 8 is a side elevational view showing the beam of FIG. 7.

FIG. 9 is a side elevational view showing a hinge and profiling wheel of the beam of FIG. 7.

FIG. 10 is a sectional view taken along line 10—10 of FIG. 9.

DETAILED DESCRIPTION OF THE INVENTION

Figure 4:
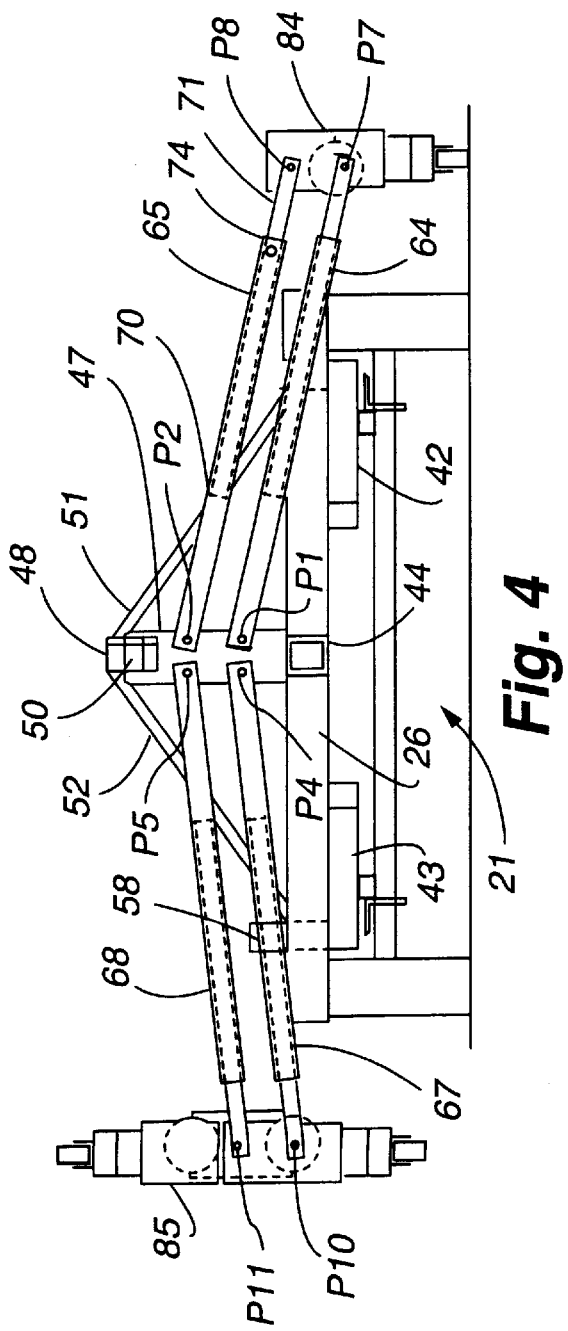
FIG. 4 is a sectional view taken along line 4—4 of FIG. 3.

Describing the specific embodiments herein chosen for illustrating the invention, certain terminology is used which will be recognized as being employed for convenience and having no limiting significance. For example, the terms "top" and "bottom" refer to the illustrated embodiment in its normal position of use. The terms "front", "back", "left" and "right" will refer to directions with reference to the normal direction of travel of the illustrated embodiment. The terms "inward" and "outward" will refer to directions relative to the sides of the apparatus. Further, all of the terminology above-defined includes derivatives of the word specifically mentioned and words of similar import.

Referring now to FIGS. 1 and 2, a dual path profilograph embodying features of this invention has transport means shown as trailer 11, a first profiling means shown as left first beam 12, a second profiling means shown as right second beam 13 and a recording device 14. FIGS. 3 to 6 show the trailer 11 generally stated has a frame 16 mounted on a conventional suspension unit 21 with laterally spaced left first and right second trailer wheels 19 and 20 rotably attached at opposite ends of suspension unit 21.

Trailer frame 16 is preferably of welded construction with tubular components of square metal tubing. The trailer frame 16 has tubular, elongated, parallel, spaced, longitudinal first and second frame side members 23 and 24. A tubular rear cross member 25 extends between and rigidly connects to the back ends of first and second frame side members 23 and 24, orthogonal to first and second frame side members 23 and 24. A tubular front cross member 26 extends between and rigidly connects to the front ends of frame first and second side members 23 and 24, orthogonal to first and second frame side members 23 and 24. First and second frame side members 23 and 24, rear cross member 25 and front cross member 26 form a rectangle.

Rear cross member 25 has first and second end portions 27 and 28 that extend outwardly from the back ends of first and second frame side members 23 and 24. A tubular intermediate cross member 29 rigidly attaches to the tops of first and second frame side members 23 and 24 forward of and parallel to rear cross member 25. The intermediate cross member 29 is substantially equal in length to rear cross member 25 and has first and second end portions 30 and 31 extending outwardly from first and second frame side members 23 and 24. First and second axle mounting brackets 32 and 33 rigidly mount to first and second frame side members 23 and 24, respectively, between rear cross member 25 and intermediate cross member 26.

First fender 34 and second fender 35 are of similar construction so a description of one applies to both. First fender 34 is generally in the shape of an inverted curved channel having a downwardly opening rear portion 36 rigidly attached to first end portion 27 of rear cross member 25 and extending upwardly and forwardly therefrom, a downwardly opening intermediate portion 37 rigidly attached to rear portion 36 and extending horizontally forwardly therefrom, and a downwardly opening front portion 38 rigidly attached to intermediate portion 37. Front portion 38 extends downwardly forwardly from intermediate portion 37 to first end portion 30 of intermediate cross member 29 and rigidly attaches thereto. Suspension unit 21 attaches to first and second axle mounting brackets 32 and 33 so that first and second trailer wheels 19 and 20 are disposed beneath first and second fenders 34 and 35 respectively.

A tubular elongated first tongue side member 42 rigidly attaches to and extends forwardly and inwardly from the bottom of first frame side member 23 between front cross member 26 and intermediate cross member 29. A tubular elongated second tongue side member 43 rigidly attaches to and extends forwardly and inwardly from the bottom of second frame side member 24 between front cross member 26 and intermediate cross member 29. First and second tongue side members 42 and 43 converge forward of front cross member 26 and the forward ends of first and second tongue side members 42 and 43 rigidly connect together. A tubular elongated tongue center member 44 attaches at a rear end to the center of front cross member 26. Tongue center member 44 extends forwardly across the top of the connection of first and second tongue side members 42 and 43 and attaches thereto. Tongue center member extends forward of the connection to first and second tongue side members 42 and 43 and has a hitch portion 45 at a front end. Hitch portion 45 is preferably a conventional ball type trailer hitch. Hitch portion 45 may be hitched to a motor vehicle M to suspend the front of trailer frame 16.

A laterally extending, flat, rectangular, rear upright member 46 rigidly attaches to and extends upwardly from the top forward center of intermediate cross member 29. A laterally extending, flat, rectangular, front upright member 47, of substantially the same height as rear upright member 46, rigidly attaches to and extends upwardly from the top forward center of front cross member 26. A tubular, elongated, longitudinal, intermediate center member 48 extends horizontally between and rigidly attaches to the tops of rear upright member 46 and front upright member 47.

A tubular rear center member 49 extends downwardly and rearwardly from the top center of rear upright member 46 to the center of rear cross member 25. A tubular front center member 50 extends downwardly and forwardly from the top center of front upright member 47 to tongue center member 44 above the connection to first and second tongue side members 42 and 43. Tubular first and second diagonal struts 51 and 52 rigidly attach to intermediate center member 48 between front upright member 47 and rear upright member 46, and extend outwardly and downwardly for rigid attachment to first and second side members 23 and 24, respectively.

First and second front beam cradle portions 54 and 55 are of similar construction so a description of one applies to both. With reference to first front beam cradle portion 54, there is a tubular, elongated, longitudinal, outer front cradle support section 56, a tubular elongated inner front cradle support section 57, and a front cradle 58. Outer front cradle support section 56 rigidly attaches to the top of first frame side member 23 adjacent to front cross member 26. Inner front cradle support section 57 is slidable in the outer front cradle support section 56 and extends forwardly therefrom, telescoping between a rearward measuring position and a forward traveling position. The front cradle 58 has an upwardly opening U shape and rigidly attaches to a front end of inner front cradle support section 57.

First and second rear beam cradle portions 59 and 60 are of similar construction so a description of one applies to both. With reference to first rear beam cradle portion 59, there is a tubular elongated rear cradle support section 61 and an upward opening, U shaped rear cradle 62 rigidly attached to an outer end of the rear cradle support section 61. Rear cradle support section 61 extends into a first outer end of the trailer frame intermediate cross member 29 and is slidable therein, telescoping between a inner measuring position and an outer traveling position.

First front lower link 64, first front upper link 65, first rear link 66, second front lower link 67, second front upper link 68 and second rear link 69 are of similar construction. Referring to front upper link 64 there is a tubular elongated link outer section 70 and a tubular elongated link inner section 71 concentric with and slidable in link outer section 70. Link outer section 70 has a link outer section hole 72 at one end and link inner section has a plurality of spaced link inner section holes 73 so that the length of front lower link 64 may be adjusted by telescoping inner link section 71 out of outer link section 70 to the selected length and inserting a link bolt 74 through link outer section hole 72 and through a selected link inner section hole 73.

Figure 5:
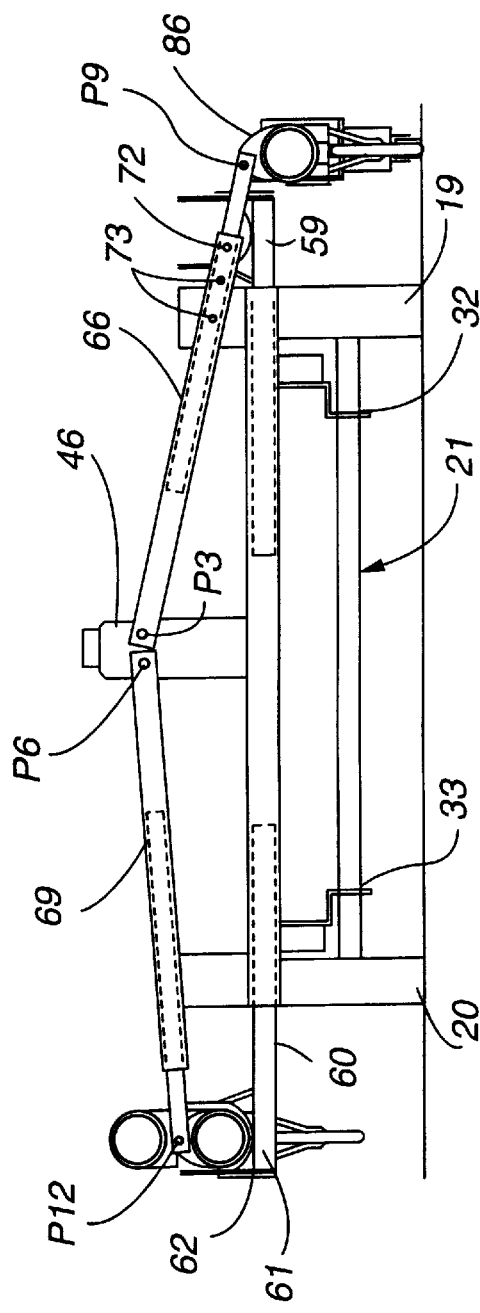
FIG. 5 is a sectional view taken along line 5—5 of FIG. 3.

Referring to FIG. 4, the inner ends of first front lower link 64 and second front lower link 67 pivotally mount on laterally opposite sides of the center of front upright member 47 with pivot axes P1 and P4, respectively, parallel to the direction of travel. The inner end of first front upper link 65 pivotally mounts to front upright member 47 with a pivot axis P2 vertically above and parallel to the axis P1 of first front lower link 64. The inner end of second front upper link 68 pivotally mounts to front upright member 47 with a pivot axis P5 vertically above and parallel to the axis of second front lower link 67. Referring now to FIG. 5, the inner ends of first rear link 66 and second rear link 69 pivotally mount on laterally opposite sides of the center of rear upright member 46 with pivot axes P3 and P6, respectively, parallel to the direction of travel.

First and second beams 12 and 13 are of a similar construction so a description of one applies to both and are preferably about twenty-five feet long. In FIGS. 3 to 5 first beam is shown in the operational or measuring configuration and second beam is shown in the traveling configuration. Referring to FIGS. 7 and 8, with reference to first beam 12 there is shown an elongated cylindrical front beam section 76 and an elongated cylindrical rear beam section 77. Hinge 78 connects the rear end of front beam section 76 to the front end of rear beam section 77.

Front and rear bogies 79 and 80 each have a horizontal longitudinal upper first plate 81 and two horizontal longitudinal lower second plates 82. Second plates 82 rigidly attach to the bottom of first plate 81 with the center of one second plate 82 substantially at each end of first plate 81, such that second plates 82 extend in toward the center of first plate 81 and out beyond the ends of first plate 81. Two longitudinally spaced castered wheels 83 pivotally mount to the bottom of each second plate 82 with a vertical pivot axis and a horizontal wheel rotation axis so that front and rear bogies 79 and 80 each have four substantially equally longitudinally spaced castered wheels 83.

Front bogie 79 has a rectangular front bogie upright plate 84 attached to and extending vertically upward from substantially the center of the top of first plate 81. An intermediate portion of front bogie upright plate 84 rigidly attaches to the front end of front beam section 76. Rear bogie 80 has a rectangular rear bogie upright plate 85 attached to and extending vertically upward from substantially the center of the top of first plate 81. An upper portion of rear bogie upright plate 85 rigidly attaches to the rear end of rear beam section 77.

The outer end of first front lower link 64 pivotally mounts to an intermediate portion of front bogie upright plate 84 of first beam 12 with a pivot axis P7 parallel to the direction of travel. The outer end of first front upper link 65 pivotally mounts to front bogie upright plate 84 of first beam 12 with a pivot axis P8 vertically above and parallel to the pivot axis of the outer end of first front lower link 64, so that first front lower and upper links 64 and 65 in combination with front bogie upright plate 84 of first beam 12 and front upright member 47 of trailer frame 16 form a parallelogram linkage. This parallelogram linkage prevents the first beam 12 from rotating relative to trailer 11 and maintains castered wheels 83 in vertical alignment to support first beam 12.

A saddle 86 rigidly attaches atop an intermediate portion of front beam section 76 near hinge 78. The outer end of first rear link 66 pivotally mounts to saddle 86 with a pivot axis P9 parallel to the direction of travel. First lower and upper links 64 and 65 in combination with first rear link 66 maintain first beam 12 parallel to the direction of travel of trailer 11 while allowing first beam 12 to move up and down relative to trailer 11. Castered wheels 83 allow first beam 12 to rotate freely in the horizontal plane with trailer 11. Second beam 13 similarly connects to second front lower link 67 at pivot axis P10, second front upper link 68 at pivot axis P11, and second rear link 69 at pivot axis P12 on the side of trailer 11 opposite first beam 12.

The distance between the dual paths measured by the present invention is adjusted by adjusting the lengths of first front lower link 64, first front upper link 65, first rear link 66, second front lower link 67, second front upper link 68 and second rear link 69. The six links are all adjusted to the same length as described above. The distance between the dual paths in the disclosed embodiment may be set for United States and foreign roadway measurement and for data collection for automated paving control.

Figure 11:
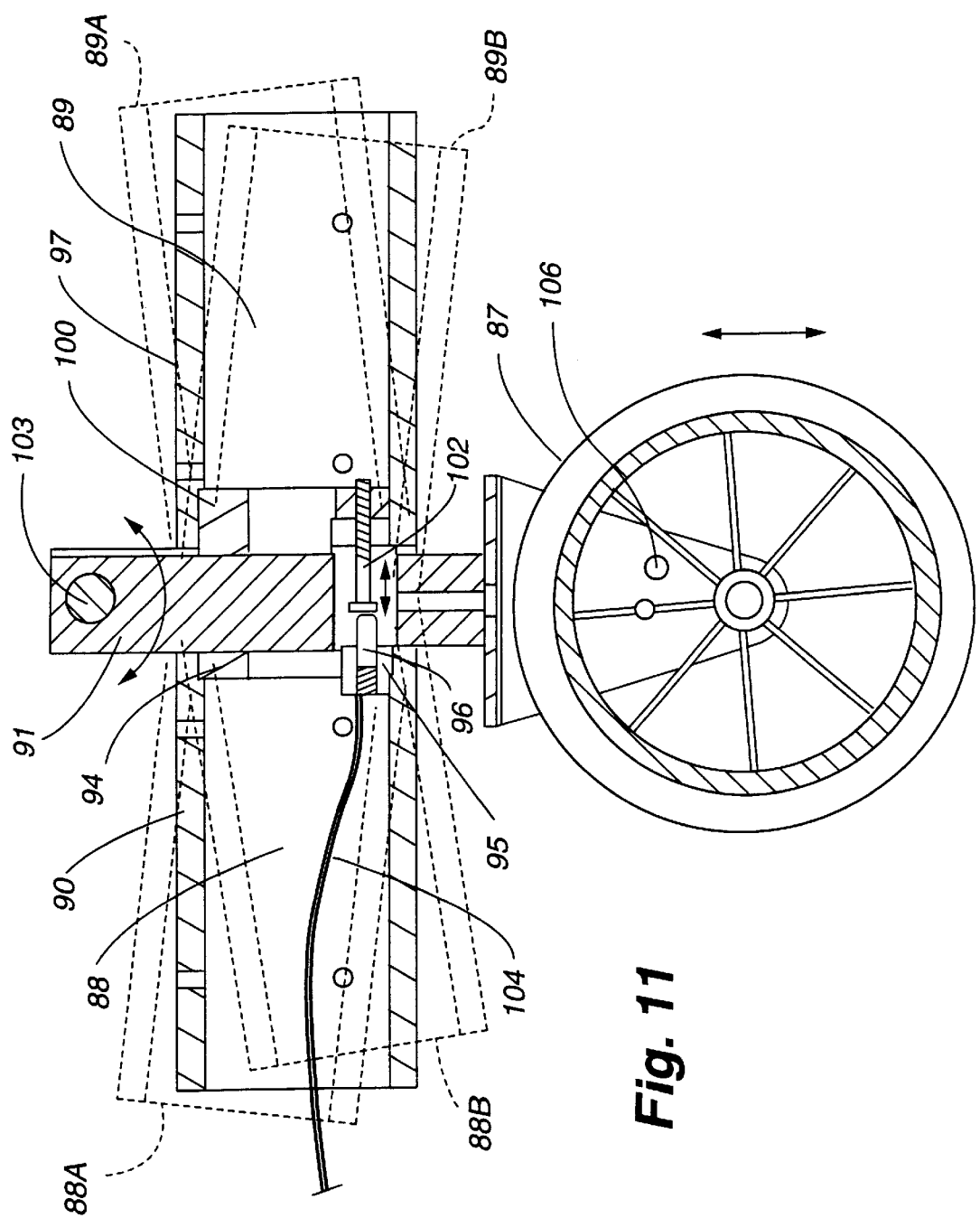
FIG. 11 is a sectional view taken along line 10—10 of FIG. 9 with the hinge rotated 180° relative to FIG. 10 with up and down profiling wheel defection shown in dashed lines.

FIGS. 9 to 11 show the hinge 78 and profiling wheel 87. Hinge 78 has a hinge front portion 88 and a hinge back portion 89. The hinge front portion 88 has a cylindrical front hinge body portion 90 sized and shaped to fit into and attach to the back end of front beam section 76. A vertical front hinge plug 94 rigidly attaches across the rear end of front hinge body portion 90. An elongated square front hinge rod 91 rigidly attaches vertically across front hinge plug 94. Front hinge rod 91 has an outer end 92 extending above front beam section 76 with a horizontal sideways front hinge aperture 93. Profile measuring device 95 attaches to and extends through front hinge plug 94. Profile measuring device 95 has a rearwardly extending, rearwardly spring biased plunger 96 and generates an electrical signal proportional to the position of plunger 96.

The hinge back portion 89 has a cylindrical back hinge body portion 97 sized and shaped to fit into and attach to the front end of back beam section 77. A vertical back hinge plug 100 rigidly attaches across the front end of back hinge body portion 97. Two similar elongated parallel spaced square back hinge rods 98 rigidly attach vertically across back hinge plug 100. Back hinge rods 98 each have an outer end 99 extending above back beam section 77 with horizontal sideways, mutually aligned, back hinge apertures 101. A profile measuring device actuator 102 extends forwardly from back hinge plug 100. Actuator 102 is adjustable forwardly and rearwardly, and may be a conventional bolt in a threaded hole in back hinge plug 100. Hinge pin 103 extends through front and back hinge apertures 93 and 101, with front hinge rod 91 disposed between the two back hinge rods 98, to pivotally attach hinge front and back portions 88 and 89 together. When hinge back portion 89 is rotated to the measuring configuration, as shown in FIG. 11, the actuator 102 bears against plunger 96.

Profiling wheel 87 rotably mounts to front hinge rod 91 opposite front hinge rod outer end 92 with a horizontal rotational axis perpendicular to the direction of travel so that profiling wheel 87 rolls in the direction of travel the profilograph. Front bogie 79 supports the front end of front beam section 76 and rear bogie 80 supports the back end of back beam section 77 while profiling wheel 87 supports the back end of front beam section 76 and, through hinge 78, the front end of back beam section 77. Irregularities in the road surface deflect profiling wheel 87 vertically up and down relative to front and rear bogies 79 and 80, rotating front and back hinge portions 88 and 89 relative to each other. The rotation of front and back hinge portions 88 and 89, shown in dashed lines as 88B and 89B, on an upward deflection of profiling wheel 87 moves actuator 102 forward so that actuator 102 pushes plunger 96 forward into profile measuring device 95 and profile measuring device 95 generates a corresponding electrical signal. Downward deflection of profiling wheel 87 rotates front and back hinge portions 88 and 89, shown in dashed lines as 88A and 89A, and moves actuator 102 rearward so that actuator 102 allows plunger 96 to extend further out of profile measuring device 95 and profile measuring device 95 generates a corresponding electrical signal. A first cable 104 transmits the electrical signal from the profile measuring device 95 on first beam 12 to an interface box 15 and a second cable 105 transmits the electrical signal from the profile measuring device 95 on second beam 13 to interface box 15.

A distance measuring device 106 connects to profiling wheel 87 on first beam 12. Distance measuring device 106 detects the distance traveled by the outer circumference of profiling wheel 87, producing an electrical signal proportional to the distance and transmitting the distance to interface box 15 via first cable 104. Distance measuring device 106 is preferably a magnetic pickup that senses a magnet on profiling wheel 87 but could alternatively be an encoder connected to an axle of profiling wheel 87.

The interface box 15 preferably has a power cable 110 that plugs into the cigarette lighter of the towing vehicle to supply electrical power to the profile measuring devices 95 and the distance measuring device 106. The interface box 15 transmits the electrical signals received from the profile measuring devices 95 and the distance measuring device 106 to recording device 14. Recording device 14 is preferably a laptop computer located in the interior of the towing vehicle M.

FIG. 1 shows a dual path profilograph in the measuring configuration. The profilograph converts to a traveling configuration as shown in FIG. 2 for transportation between measuring sites. A top beam cradle 107 is a generally rectangular plate and has oppositely opening U shaped first and second cutouts 108 and 109. First cutout 108 is disposed over front beam section 76 near the front end and rigidly attaches thereto with second cutout 109 opening vertically up.

The profilograph is converted to the traveling configuration from the measuring configuration by first folding the rear beam section 77 over the front beam section 76 of first beam 12 so that rear end of rear beam section 77 nests into second cutout 109 of top beam cradle 107. First beam 12 is lifted so that first front lower link 64 is higher than the front cradle 58 of the first front beam cradle portion 54 and front beam section 76 is higher than the rear cradle 62 of the first rear cradle portion 59. First front cradle portion 54 is telescoped out so that the front cradle 58 is directly beneath first front lower link 64 and first rear cradle portion 59 is telescoped out so that the rear cradle 62 is directly beneath front beam section 76. First beam 12 is then lowered so that first front lower link 64 is supported by front cradle 58 and front beam section 76 is supported by rear cradle 62. Second beam 13 is then similarly folded and suspended.

Although the present invention has been described with a certain degree of particularity, it is understood that the present disclosure has been made by way of example and that changes in details of structure may be made without departing from the spirit thereof.

What is claimed is:

1. Apparatus for measuring profiles of a surface comprising:
    a transport means that moves along said surface,
    a first profiling means on a first side of said transport means, said first profiling means including an elongated first beam having a wheel at a front end and a wheel at a back end, a first surface engagement means intermediate said front and back ends that is vertically deflected by irregularities in said surface, and a first profile measuring device for generating a first electrical signal proportional to the deflection of said first surface engagement means by said irregularities,
    a second profiling means on a second side of said transport means opposite and spaced a selected lateral distance from said first profiling means, said second profiling means including an elongated second beam having a wheel at a front end and a wheel at a beck end, a second surface engagement means intermediate said front and back ends that is vertically deflected by irregularities in said surface and a second profile measuring device for generating a second electrical signal proportional to the deflection of said second surface engagement means by said irregularities, and
    a distance measuring device connected to said first profiling means for generating a third electrical signal proportional to the horizontal distance traveled by said first profiling means.

2. The apparatus as set forth in claim 1 wherein said first surface engagement means includes a first profiling wheel and said second surface engagement means includes a second profiling wheel.

3. The apparatus as set forth in claim 1 further including a recording device electrically connected to said first profile measuring device, said second profile measuring device and said distance measuring device for recording said first, second and third electrical signals.

4. The apparatus as set forth in claim 3 wherein said recording device includes a laptop computer.

5. The apparatus as set forth in claim 1 wherein said first beam has a hinge intermediate said front and back ends, and
    said second beam has a hinge intermediate said front and back ends.

6. The apparatus as set forth in claim 5 wherein said first beam folds at said hinge of said first beam and said second beam folds at said hinge of said second beam for transport of said first and second beams between measuring sites.

7. The apparatus as set forth in claim 1 wherein said first profiling means is attached to said transport means by a first linking means, said first linking means maintaining said first profiling means at fixed position laterally and longitudinally relative to said transport means, said first linking means preventing said first profiling means from rotating relative to said transport means along an axis parallel to the direction of travel of said transport means, and said first linking means enabling said first profiling means to move vertically relative to said transport means, and
    said second profiling means is attached to said transport means by a second linking means, said second linking means maintaining said second profiling means at fixed position laterally and longitudinally relative to said transport means, said second linking means preventing said second profiling means from rotating relative to said transport means along an axis parallel to the direction of travel of said transport means, and said second linking means enabling said second profiling means to move vertically relative to said transport means.

8. The apparatus as set forth in claim 7 wherein said first linking means includes a first front lower link, a first front upper link and a first rear link, and
    said second linking means includes a second front lower link, a second front upper link and a second rear link.

9. Apparatus for measuring profiles of a surface comprising:
    a transport means that moves along said surface,
    a first profiling means on a first side of said transport means, said first profiling means including a first surface engagement means that is vertically deflected by irregularities in said surface and a first profile measuring device for generating a first electrical signal proportional to the deflection of said first surface engagement means by said irregularities, and
    a second profiling means on a second side of said transport means opposite and spaced a selected lateral distance from said first profiling means, said second profiling means including a second surface engagement means that is vertically deflected by irregularities in said surface and a second profile measuring device for generating a second electrical signal proportional to the deflection of said second surface engagement means by said irregularities,
    said first profiling means being attached to said transport means by a first linking means, said first linking means maintaining said first profiling means at fixed position laterally and longitudinally relative to said transport means, said first linking means preventing said first profiling means from rotating relative to said transport means along an axis parallel to the direction of travel of said transport means, and said first linking means enabling said first profiling means to move vertically relative to said transport means,
    said second profiling means being attached to said transport means by a second linking means, said second linking means maintaining said second profiling means at fixed position laterally and longitudinally relative to said transport means, said second linking means preventing said second profiling means from rotating relative to said transport means along an axis parallel to the direction of travel of said transport means, and said second linking means enabling said second profiling means to move vertically relative to said transport means said first linking means including a first front lower link, a first front upper link and a first rear link, said second linking means including a second front lower link, a second front upper link and a second rear link, one end of said first front lower link being pivotally attached to a front end of said transport means with a pivot axis parallel to the direction of travel and an opposite end of said first front lower link is pivotally attached to a front end of said first profiling means with a pivot axis parallel to the direction of travel, one end of said first front upper link being pivotally attached parallel to said first lower link to said front end of said transport means with a pivot axis parallel to the direction of travel and an opposite end of said first front upper link is pivotally attached to said front end of said first profiling means with a pivot axis parallel to the direction of travel, so that said first front lower link, first front upper link, front end of said transport means and front end of said first profiling means form a parallelogram linkage, one end of said second front lower link being pivotally attached to a front end of said transport means with a pivot axis parallel to the direction of travel and an opposite end of said second front lower link is pivotally attached to a front end of said second profiling means with a pivot axis parallel to the direction of travel, and one end of said second front upper link being pivotally attached parallel to said second lower link to said front end of said transport means with a pivot axis parallel to the direction of travel and an opposite end of said second front upper link is pivotally attached to said front end of said second profiling means with a pivot axis parallel to the direction of travel, so that said second front lower link, second front upper link, front end of said transport means and front end of said second profiling means form a parallelogram linkage.

10. The apparatus as set forth in claim 9 wherein one end of said first rear link is pivotally attached to an intermediate portion of said transport means with a pivot axis parallel to the direction of travel and an opposite end of said first rear link is pivotally attached to an intermediate portion of said first profiling means with a pivot axis parallel to the direction of travel, and one end of said second rear link is pivotally attached to an intermediate portion of said transport means with a pivot axis parallel to the direction of travel and an opposite end of said second rear link is pivotally attached to an intermediate portion of said second profiling means with a pivot axis parallel to the direction of travel.

11. The apparatus as set forth in claim 10 wherein said first front lower link, said first front upper link, said first rear link, said second front lower link, said second front upper link, and said second rear link are each adjustable in length for selecting the lateral distance between said first profiling means and said second profiling means.

12. The apparatus as set forth in claim 1 wherein said transport means is a trailer towable by a motor vehicle.

13. The apparatus as set forth in claim 12 wherein said trailer has a plurality of cradles, said cradles supporting and carrying said first and second profiling means for transport between measuring sites.

14. Apparatus for simultaneously and continuously measuring and recording laterally spaced first and second profiles of a road comprising:

a trailer adapted for towing behind a motor vehicle, an elongated cylindrical first beam having front and rear bogies attached at opposite front and back ends for supporting said beam above said road, each of said front and rear bogies having a plurality of castered wheels, said first beam being attached to a first side of said trailer by a parallelogram linkage at said front end to maintain said first beam in an upright position, said parallelogram linkage having parallel front lower and upper links each pivotally connected to said trailer at one end and pivotally connected to said first beam at an opposite end, said first beam being attached to said trailer by a rear link, said rear link pivotally connecting to said trailer at one end and pivotally connecting at an opposite end to said first beam intermediate said front end and said back end, said front lower, front upper and rear links maintaining said first beam parallel said trailer, said castered wheels allowing said first beam to turn when said trailer turns, an elongated cylindrical second beam having front and rear bogies attached at opposite front and back ends for supporting said beam above said road, each of said front and rear bogies having a plurality of castered wheels, said second beam attaching to a second side of said trailer opposite and a selected lateral distance from said first beam, said second beam being attached to said second side by a parallelogram linkage at said front end to maintain said second beam in an upright position, said parallelogram linkage having parallel front lower and upper links each pivotally connected to said trailer at one end and pivotally connected to said second beam at an opposite end, said second beam being attached to said trailer by a rear link, said rear link pivotally connecting to said trailer at one end and pivotally connecting at an opposite end to said second beam intermediate said front end and said back end, said front lower, front upper and rear links maintaining said second beam parallel said trailer, said castered wheels allowing said second beam to turn when said trailer turns, a first profiling wheel attached to said first beam intermediate said front and back ends, said first profiling wheel being defected by irregularities in said road, a second profiling wheel attached to said second beam intermediate said front and back ends, said second profiling wheel being defected by irregularities in said road, a first profile measuring device that attached to said first beam that generates a first electrical signal proportional to the deflection of said first profiling wheel, a second profile measuring device that attached to said second beam that generates a second electrical signal proportional to the deflection of said second profiling wheel, a distance measuring device connected to said first profiling wheel that generates a third electrical signal proportional to the rotation of said first profiling wheel, and a recording device electrically connected to said first profile measuring device, said second profile measuring device and said distance measuring device, said recording device receiving and recording said first, second and third electrical signals, said first and second beams each having a front beam section, a rear beam section and a hinge connecting said front and rear beam sections, said front beam section having a top beam cradle, said rear beam section being folded over said front beam section and received in said top beam cradle for transport, said trailer having first front and rear beam cradle portions for carrying said first beam and second front and rear beam cradle portions for carrying said second beam during transport.

* * * * *